US006685235B1

(12) United States Patent
Hart

(10) Patent No.: US 6,685,235 B1
(45) Date of Patent: Feb. 3, 2004

(54) SYSTEM AND METHOD FOR ATTACHING TUBING

(75) Inventor: Russell F. Hart, Blue Grass, IA (US)

(73) Assignee: Carleton Life Support Systems, Inc., Orchard Park, NY (US)

(*) Notice: Subject to any disclaimer, the term of this patent is extended or adjusted under 35 U.S.C. 154(b) by 81 days.

(21) Appl. No.: 10/041,287

(22) Filed: Jan. 7, 2002

Related U.S. Application Data

(63) Continuation-in-part of application No. 09/573,891, filed on May 19, 2000, now Pat. No. 6,352,624.

(51) Int. Cl.[7] .................................................. F16L 39/00
(52) U.S. Cl. ........................ 285/318; 285/268; 285/187; 285/225
(58) Field of Search ................................. 285/261, 268, 285/269, 318, 187, 905, 223, 225, 200

(56) References Cited

U.S. PATENT DOCUMENTS

| 373,072 | A | * | 11/1887 | Jarvis | 92/167 |
|---|---|---|---|---|---|
| 1,883,279 | A | * | 10/1932 | Zerk | 285/9.2 |
| 3,837,178 | A | * | 9/1974 | Hackforth et al. | 464/89 |
| 4,277,092 | A | * | 7/1981 | Viers | 285/263 |
| 4,713,152 | A | | 12/1987 | Walsh | |
| 4,856,827 | A | * | 8/1989 | Delamare | 285/268 |
| 5,186,793 | A | | 2/1993 | Michaels | |
| 5,205,990 | A | | 4/1993 | Lawless | |
| 5,332,483 | A | | 7/1994 | Gordon | |
| 5,335,947 | A | * | 8/1994 | Remsburg | 285/316 |
| 5,441,610 | A | | 8/1995 | Renlund et al. | |
| 5,871,624 | A | | 2/1999 | Crome | |
| 5,985,113 | A | | 11/1999 | Crome | |
| 6,033,457 | A | | 3/2000 | Lawless | |
| 6,194,335 | B1 | | 2/2001 | Crome | |

* cited by examiner

Primary Examiner—Lynne H. Browne
Assistant Examiner—James M. Hewitt
(74) Attorney, Agent, or Firm—Marsteller & Associates, P.C.

(57) ABSTRACT

An attachment system (601) for maintaining a passageway (603) of a tube (605) in axial alignment with a passageway (607) through a housing (609) includes a spring (611) having an exterior edge (613) and an interior area (615) passing the tube (605). The housing (609) has an exterior mating surface (404) around the passageway (607). A mating end (402) of the tube (605) abuts against the mating surface (404). A spring retainer (617) apart from mating surface (404) restrains the movement of the spring (611) away from the mating surface (404). A tubular coupler (619) in proximity to the mating end (402) restricts the movement of the mating end (402) toward the interior area (615) of the spring (605).

36 Claims, 12 Drawing Sheets

SYSTEM AND METHOD FOR ATTACHING TUBING

This application is a Continuation-in-part of application Ser. No. 09/573,891, filed on May 19, 2000, now U.S. Pat. No. 6,352,624.

SPECIFICATION

BACKGROUND OF THE INVENTION

1. Technical Field

This invention relates to devices and method for attaching tubing to a member having a passageway to communicate a fluid. More particularly, the invention relates to a system to mount a tube to a housing when the tube and the housing are composed of materials having differing thermal expansion coefficients.

2. Background Art

It is well known, and has been demonstrated, that oxygen can be removed from more complex gasses, such as air, by an electrochemical process of ionizing the oxygen molecules, transporting the oxygen ions through a solid electrolyte and reforming the oxygen molecules on an opposite electrolyte surface. An electrical potential is applied to a suitable catalyzing electrode coating applied to the surface of the electrolyte which is porous to oxygen molecules and which acts to disassociate oxygen molecules into oxygen ions at its interface with the electrolyte. The oxygen ions are transported through the electrolyte to the opposite surface, which is also coated with a catalyzing electrode and electrically charged with the opposite electrical potential that removes the excess electrons from the oxygen ions, and oxygen molecules are reformed. However, current oxygen generating systems are unable to deliver high-pressure oxygen above 1200 psi. Thus, a need exists in the art for a system and a method which provides high-pressure oxygen. Another need exists in the art for an oxygen generating system which can use contaminated air which is contaminated, for example, with biological agents or other toxic substances.

DISCLOSURE OF INVENTION

It is, therefore, an object of the present invention to provide an electrochemical oxygen generating system which can provide high-pressure oxygen.

It is another object of the present invention to provide an electrochemical oxygen generating system which can provide oxygen at pressures up to 2000 psi.

Another object of the present invention is to provide a unique mounting and interconnection structure for supporting tubing connecting the oxygen generating modules.

Still another object of the present invention is to provide a method of sealing a ceramic tube to a ceramic module to allow each to thermally expand and contract without cracking.

These and other objects of the present invention are achieved by an oxygen generating system including an oven chamber having a fresh air inlet and a depleted air outlet, and having an oxygen outlet.

The proposed invention is suitable for, but is not limited to, the delivery of high purity oxygen for many medical, semiconductor and industrial applications as well as the filtration of chemical and biological agents in civil and military environments.

An attachment system for maintaining a passageway of a tube in axial alignment with a passageway through a housing includes a spring having an exterior edge and having an interior area through which the tube passes. The housing has an exterior mating surface around the passageway through the housing against which mating surface a mating end of the tube abuts. A spring retainer spaced apart from the exterior mating surface of the housing restrains the movement of the spring away from the exterior mating surface of the housing. A tubular coupler in proximity to the mating end of the tube restricts the movement of the mating end of the tube toward the interior area of the spring.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

These and other objects, advantages and features of this invention will be apparent from the following description taken with reference to the accompanying drawings, wherein is shown the preferred embodiments of the invention.

BRIEF DESCRIPTION OF DRAWINGS

The present invention is illustrated by way of example, and not by limitation, in the figures of the accompanying drawings, wherein elements having the same reference numeral designations represent like elements throughout and wherein.

MODE(S) FOR CARRYING OUT THE INVENTION

U.S. Pat. No. 5,985,113 issued on Nov. 16, 1999, U.S. Pat. No. 5,871,624 issued on Feb. 16, 1999 and application Ser. No. 09/418,831 filed Oct. 15, 1999, now U.S. Pat. No. 6,194,335, all of which are incorporated herein in their entirety and assigned to the instant assignee, teach how an electrochemical oxygen generating device can be manufactured that not only generates oxygen, but can be used to deliver the oxygen gas at pressures exceeding 2000 psig. It should be understood that terms such as "left" and "right" as used herein are to be construed in the relative sense and that the present invention is usable in any orientation.

Figure 1:
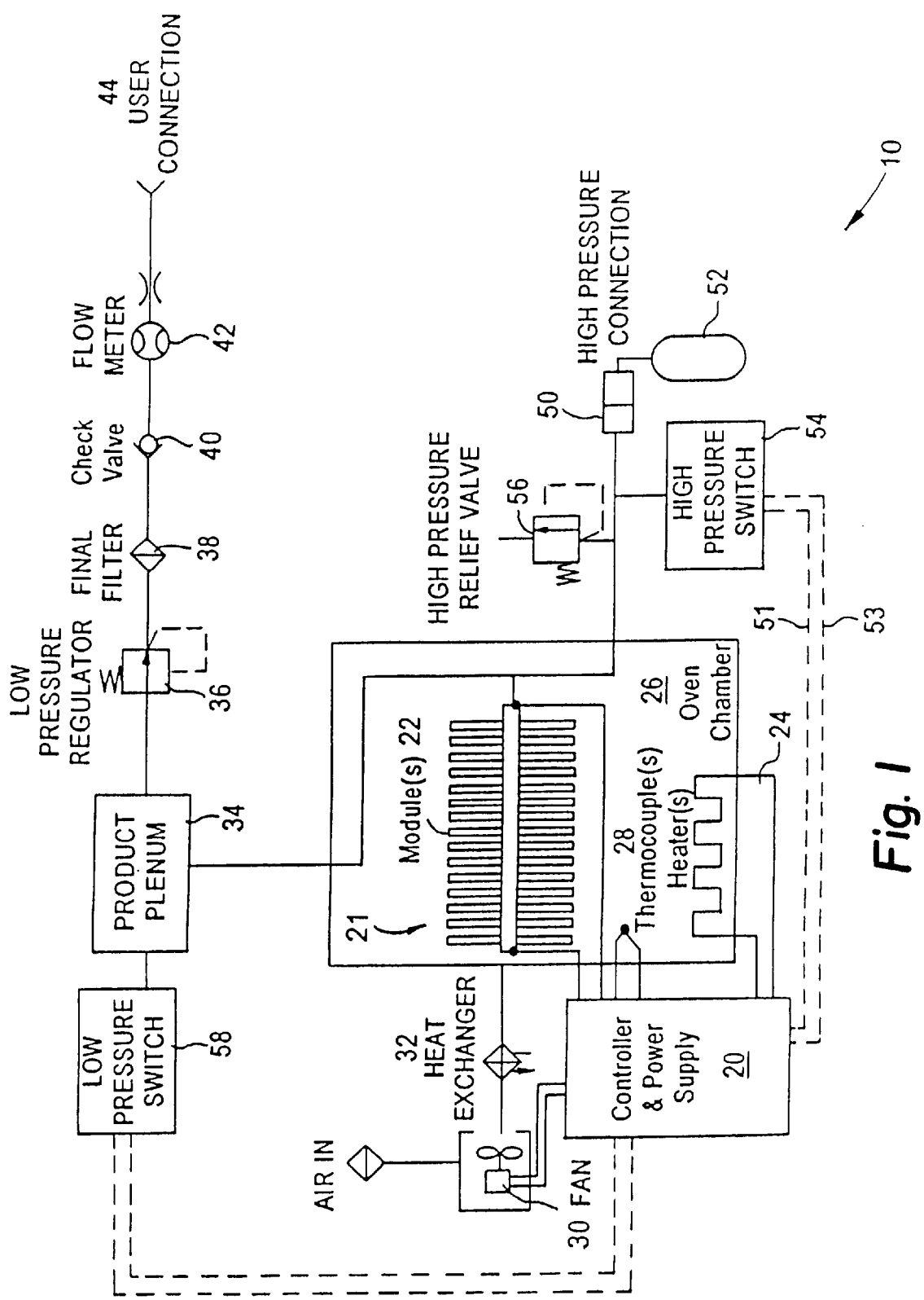
FIG. 1 depicts a schematic of a complete oxygen generating system 10 utilizing an electrochemical-oxygen generator in the form of a modular ceramic oxygen generator.

FIG. 1 illustrates a schematic of a complete oxygen generating system 10 utilizing an electrochemical-oxygen generator in the form of a modular ceramic oxygen generator. This schematic depicts a power supply and controller 20 that supplies electrical power to an oven heater 24 to raise the temperature within the operating range of an oxygen-generating module assembly 22. The oxygen-generating module 22 assembly can include one or more oxygen-generating modules such as those disclosed in U.S. Pat. Nos. 5,871,624 and 5,985,113.

The temperature range in an oven chamber 26 may be about 500 to 800 degrees Celsius, depending on the materials used to construct the oxygen-generating module assembly 22. The oxygen-generating modules 22 are positioned in the oven chamber 26. After the oven chamber 26 reaches the minimum preferred operating temperature, as detected by at least one thermocouple 28 mounted in the oven chamber 26, the controller 20 begins to apply electrical power to a fan motor 30 to deliver oxygen-laden air through a counter-flow heat exchanger 32 into the oven 26 chamber to a module assembly 21 including at least one module 22. The controller 20 also delivers electrical power to the modules 22, and oxygen is electrochemically generated, as taught in U.S. Pat. Nos. 5,871,624 and 5,985,113. Depending upon the amount of oxygen to be generated, the amount of electrical power can be varied. As electrical power is delivered to the modules 22 and oxygen is generated, electrical resistance within the modules 22 generates additional heat. To compensate for this additional heat, the controller 20 reduces power to the oven heater 24, to maintain the desired nominal operating temperature in the oven chamber 26. The oxygen being generated is delivered to a product plenum 34, which acts as a temporary oxygen storage vessel. The oxygen is delivered from the product plenum 34 to a low-pressure regulator 36, final filter 38, check valve 40, flow meter 42, and lastly a user-adjustable valve 44 for immediate use, for example, by a patient.

Oxygen may also be delivered to a high-pressure connection that allows connection 50 of a removable portable oxygen storage cylinder 52. The portable cylinder 52 is filled automatically and can be used later. The controller 20 applies appropriate electrical power to the modules 22 to generate oxygen at elevated pressures until a high-pressure switch 54 detects a pressure over about 1800 psig. Upon exceeding 1800 psig, the controller 20 reduces power to the modules 22 until pressure at the high-pressure switch 54 falls below 1800 psig. The controller 20 also electrically monitors the low-pressure switch 58. This switch 54 enables regulation of the pressure delivered to the product plenum 34 and high-pressure connector 50 to a nominal pressure of about 1800 psig. A high-pressure relief valve 56 vents excess pressure above about 2000 psig, in the event of a malfunction of the controller 20 to limit the nominal pressure to less than 2000 psig, and to relieve excessive temperature-related pressure increases. It should be understood that the maximum normal operating pressure is approximately 1800 psig. The controller 20 also electrically monitors the high-pressure switch 54. If the operating pressure is below the minimum operating pressure after a given period of time, then the controller 20 activates a warning light and audible alarm (not shown).

Figure 2:
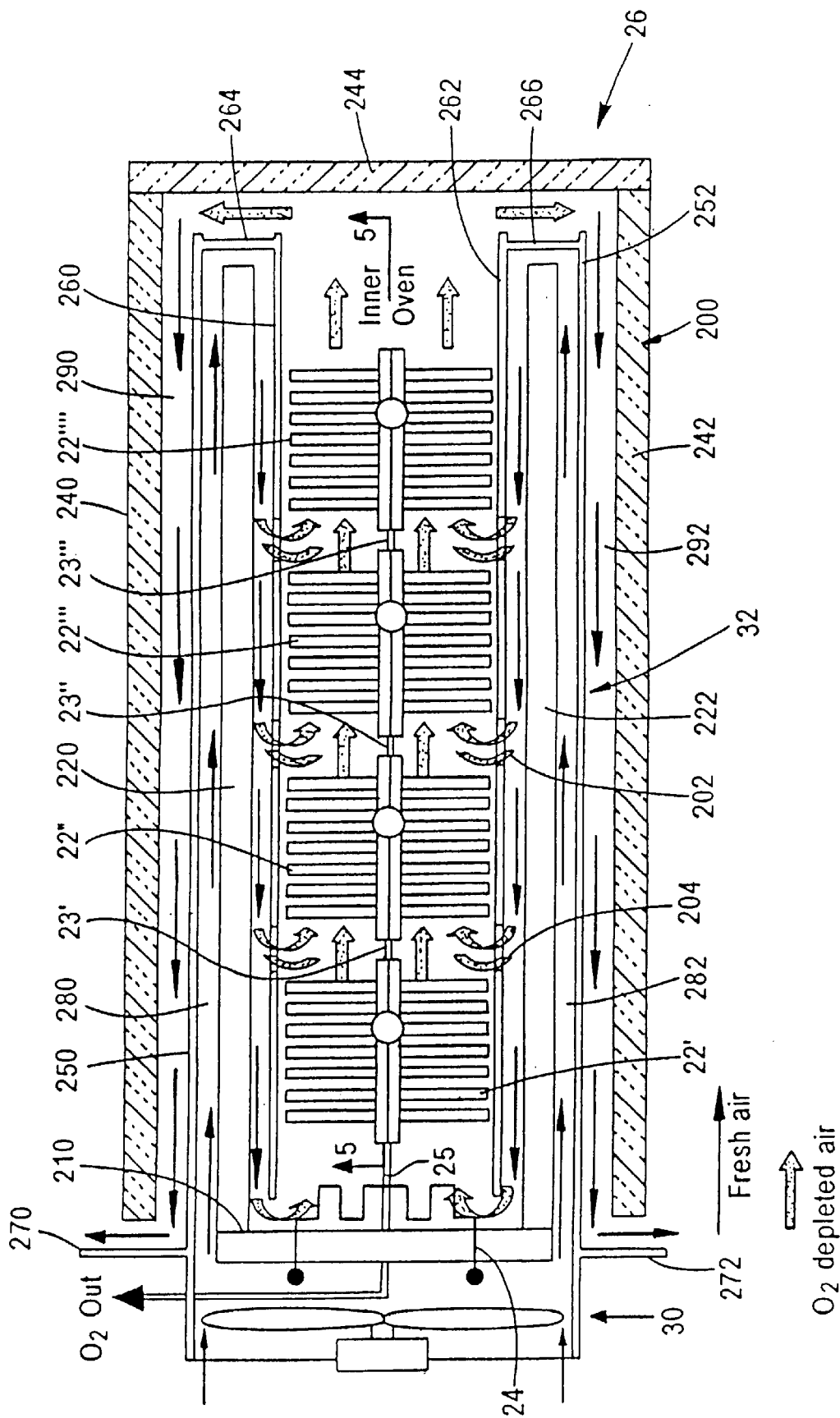
FIG. 2 is a schematic diagram depicting a cross-section of the ceramic oxygen generating system depicting the oven, insulation, modules, heaters, planar counter-flow heat exchanges, air-flow dampers and fan.

FIG. 2 illustrates a cross-section of the ceramic oxygen generating system depicting the oven 26, insulation 200, oxygen-generating module assemblies 22, heaters 24, planar counter-flow heat exchangers 32, air-flow dampers 202, and fan 30. The counter-flow heat exchanger is a very effective, simple, low-cost design approach. As depicted in FIG. 2, four oxygen generating modules 22', 22", 22'", 22"" from the oxygen-generating assembly 21 although any number of modules can be used. The oxygen-generating modules 22', 22", 22'", 22"" are manifolded together by tubes 23', 23", 23'". An outlet tube 25 passes through the wall 210 to provide high-pressure oxygen to the product plenum 34 and the high-pressure connection 50.

Cool fresh air is heated before the air enters the inner oven, and the hot air is cooled before it exits the oven 26; thereby, conserving energy. In a planar counter-flow configuration illustrated in FIG. 2, the fan 30 introduces cool, oxygen-laden air into the channels 280, 282 between the outer surface of the inner walls 220, 222 made of oven insulation 200 and the inner surfaces 250, 252 of the heat exchanger wall. This cool air is heated as it passes inward along the heat exchanger wall, because hot oxygen-depleted air is exiting outward from the inner oven 26 on the other side of the heat exchanger wall. The incoming air is also partially heated by an outer surface of the walls 220, 222 of oven insulation 200, followed by an inner surface of the walls 220, 222 of the oven insulation 200, after a 180° turn mid-way into the inner oven. Channels 280, 282 each flow from the fan 30 from left to right and then reverse and flow from right to left.

Electrical resistance is inherent to electrochemical oxygen generating systems that utilize electrical potential energy rather than chemical potential energy as a driving force. The electrochemical oxygen generating modules 22 generate heat as well as oxygen. Too much oven insulation 200 and very efficient heat exchangers could result in runaway oven temperatures. One method of temperature control is to ensure that some amount of heater activation is always used to maintain the normal operating temperature, after the initial startup period of time. Another method is to adjust the fan 30 speed to cause additional air to be circulated through the oven 26 carrying away the excess heat. The controller 20 monitors the temperature in the inner oven 26 using one or more strategically placed thermocouples 28 (not shown in FIG. 2) to ensure that the oven temperatures are normal. The controller 20 uses this information to adjust either the heater 24 voltage or fan 30 speed to control the temperature of the inner oven 26.

As depicted in FIG. 2, six air dampers 202 are used in the embodiment depicted in FIG. 2. Three dampers are each mounted to walls 260, 262 with the dampers 202 being positioned between modules 22 and opposite each other. The air dampers 202 shown allow some oxygen-laden air to enter the module chamber or inner oven 26 before completing the entire heat exchanger flow-path to the inner oven. If all oxygen-laden air were forced to traverse the entire heat exchanger flow-path, a higher temperature gradient would occur across the series of modules 22 in the oven. The air would be progressively heated as it passes over each module 22. Allowing some air to enter near the latter modules 22''', 22'''' provides a more uniform temperature across the modules 22'–22'''' and prevents modules 22''', 22'''' from possibly over-heating. These dampers 202 are adjustable and can be manually adjusted during the assembly of the system 10 and during an initial start up test process after completion of the manufacturing and assembly process of the system 10. These dampers 202 include damper flaps 204 which are mounted to a suitable cylindrical rod (not shown) that extends through the inner oven insulation and support structure to outside the inner oven 26. The external ends of the damper rods can be rotated and secured in the preferred orientation during the assembly process. Alternately, the dampers could be adjusted automatically by the controller 20, based upon the inner oven 26 temperatures measured by the thermocouples 28. Several types of electromechanical damper actuators are available that could be used.

Figure 3:
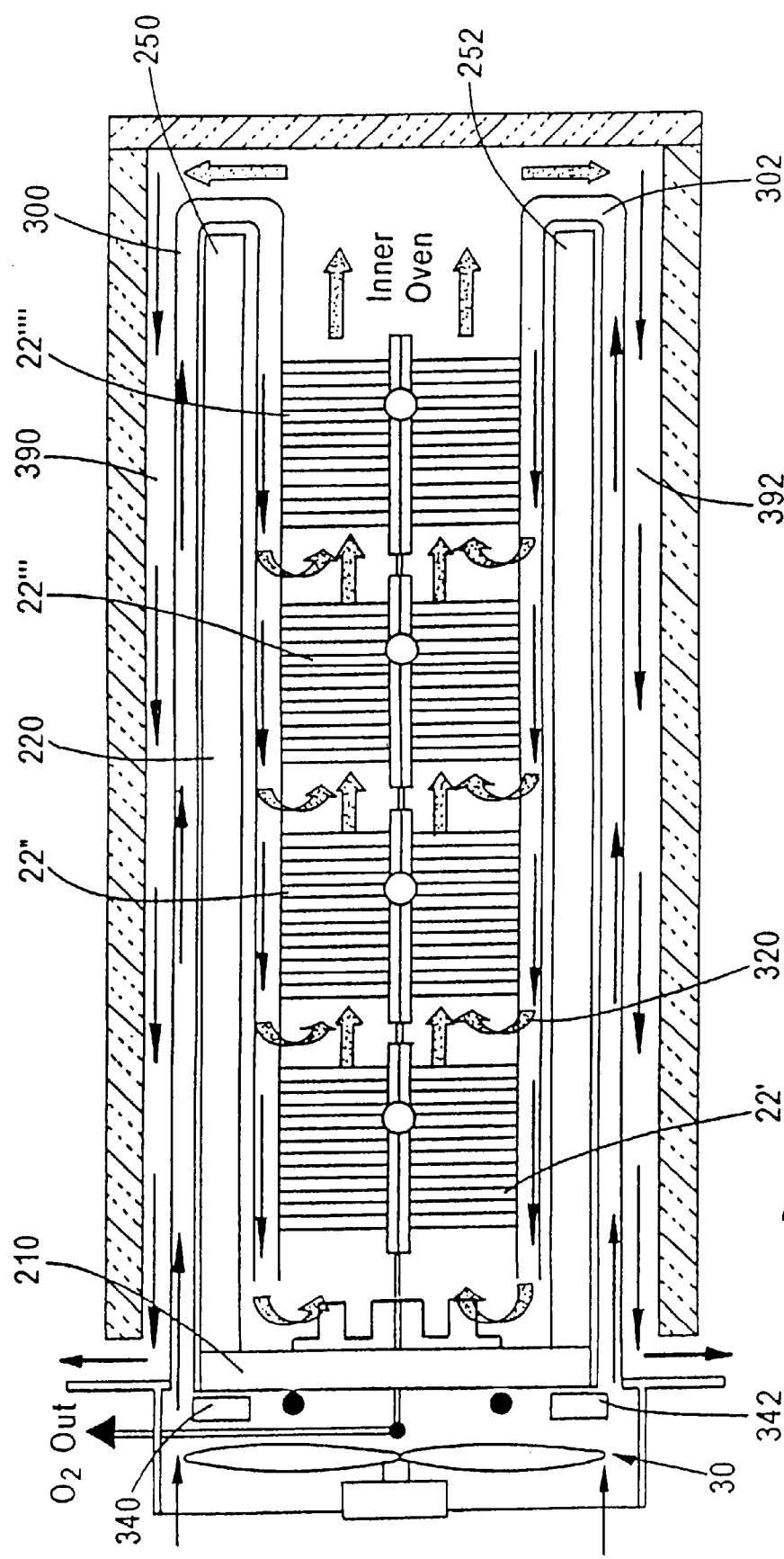
FIG. 3 is another schematic diagram similar to FIG. 2, depicting a second heat exchanger embodiment.

FIG. 3 depicts another type of heat exchanger embodiment. This is another approach comparable to the planar heat exchanger with flow control dampers described above with respect to FIG. 2. A tubular heat exchanger approach utilizes multiple cylindrical tubes 300, 302 that enter the oven between the inner and outer insulation, traverse to the far end of the oven, enter the inner oven 26, and returns to the opposite end of the oven on the inside of the inner insulation. The cool oxygen-laden air is forced into the tubes 300, 302 by the fan 30 and delivered to the inner oven 26 at the same end of the oven. The hot oxygen-depleted air flows in the opposite direction around the outside of the tubes 300, 302 to cool the oxygen-depleted air and warm the cool oxygen-laden air. Some of the tubes have holes 320 at strategic points (typically between modules 22', 22''; 22'', 22'''; and 22''', 22'''') along the return path in the inner oven, or some of the tubes end at strategic points along the return path in the inner oven 26. This allows some air to enter the chamber prior to traversing the complete length of the tubes 300, 302; thereby, allowing a more even temperature gradient as described above for the planar heat exchanger with air flow-control dampers.

As depicted in FIG. 3, dampers 340, 342 are located where the cool oxygen-laden air enters the tubes 300, 302 near the fan 30. Some of the tubes that do not have holes or do not end before traversing the complete pathway into the inner oven 26 at the fan-end also do not have dampers. The remaining tubes, that do have holes or do end before traversing the complete pathway into the inner oven at the fan-end, also do have dampers. The dampers are located at the open end of the appropriate tubes on the fan-side of a tube-plate that secures the tubes in place. The dampers can be positioned across the open-ends of the tubes to occlude them, as required to regulate the temperature of each zone within the inner oven. The dampers 340, 342 can be manually adjusted or automatically adjusted by the controller 20 as described earlier.

Another method for controlling the temperature of the ceramic generator or the rate of oxygen production is to reduce the quantity of feed air supplied to the generator, or to reduce the quantity of oxygen in the feed air. As previously explained, there is an equivalence between the rate of oxygen production and the current flow through the ceramic generator. The electrical current flow is proportional to the voltage applied to the generator minus the Nernst-Einstein voltage. The Nernst-Einstein voltage is proportional to the difference in the oxygen partial pressures at the input and output of the ceramic generator. Therefore, as the input oxygen partial-pressure decreases or as the output oxygen partial pressure increases, or both, the current flow and thus the oxygen flow is decreased. In practice the input oxygen partial pressure can be reduced by use of the dampers previously described as well as other means such as reducing fan 30 speed. As the oxygen flow and the current flow through the ceramic generator are reduced, the power dissipation in the generator is reduced thereby reducing the self-heating within the module resulting in a lower generator temperature.

Figure 4B:
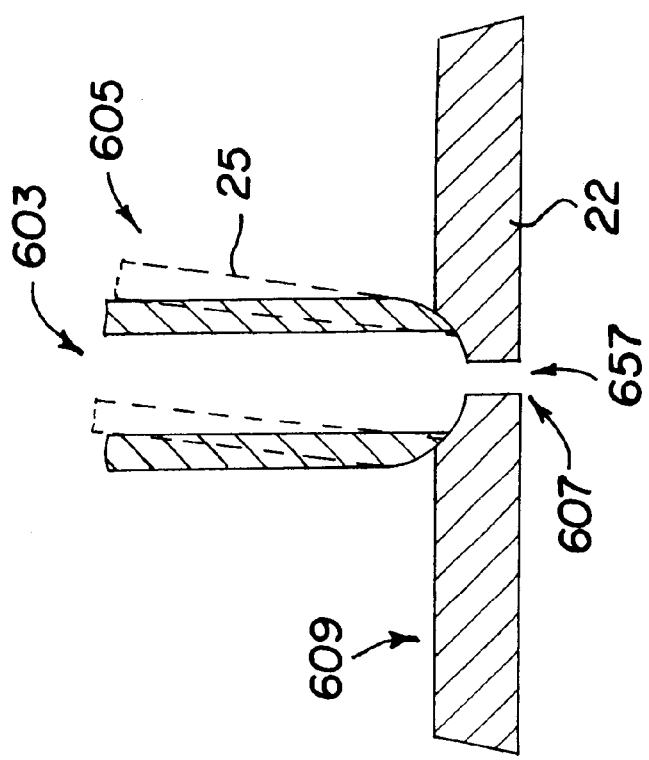
FIGS. 4A and 4B depicts a pneumatic interface using a concave depression.
Figure 4A:
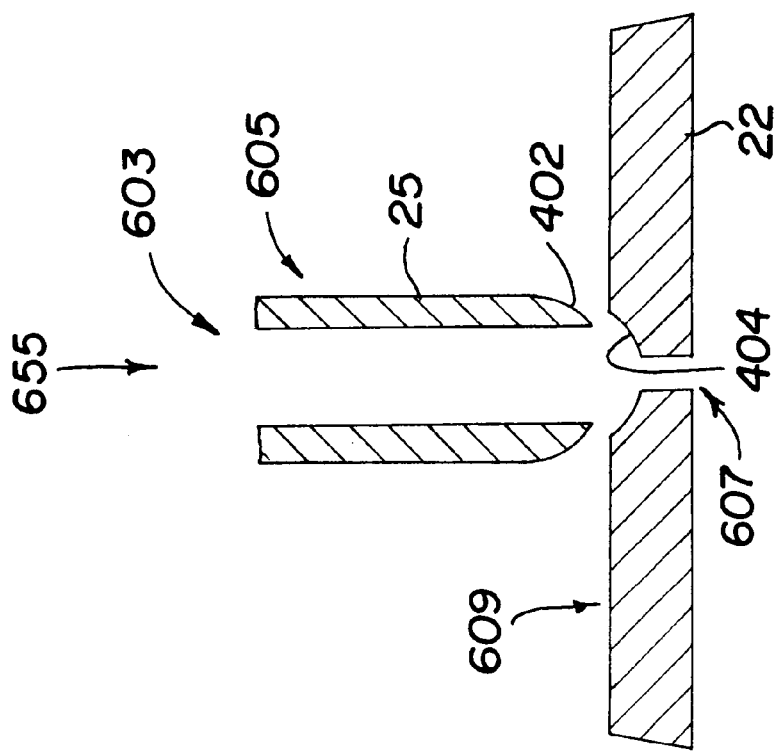

In all of the described embodiments, the oxygen delivery tubes 23', 23'', 23''' and 25 of the individual modules 22 must either extend outside the heated section of the furnace or be internally joined and the resulting tube 25 extended outside the furnace. One method of extending individual tubes outside the furnace or inner oven 26 is to use a ceramic tube 25 sealed into a matched hole or indentation in the module 22'. The use of a ceramic tube minimizes stresses on the tube-to-module interface caused by differing coefficients of thermal expansion. However, this method presents a problem in that the tube, module, and seal are all composed of brittle materials that cannot sustain any significant displacement without breaking. It is difficult to prevent the application of bending moments on the tubes using this approach. The preferred method is to form a more resilient seal by forcing a spherically shaped device or mating end 402 of the tube 25 into a matching or compatible concave surface or indentation 404 formed about the passageway 607 in the module 22 or housing 609. The convex spherical shape can be formed on the outer surface of the tube 25 and the concave surface in the module wall or vice versa. Also, the concave depression could be conical in form as well as spherical. This method allows a seal that will accommodate a significant amount of misalignment if the tube 25 is continuously pressed into the concave surface 404 as, for instance, by the action of a spring or weight. FIG. 4 illustrates this method and shows a significant misalignment accommodated while still maintaining a viable seal.

Referring now particularly to FIGS. 12 through 15, an attachment system 601 maintains a passageway 603 of a tube 605, such as a ceramic tube 25, in axial alignment with a passageway 607 through a housing 609, such as the module 22 by way of example. The attachment system 601 includes a spring 611 having an exterior or outside edge 613 and having an interior area 615 with an opening 615' through which the tube 605 passes. The housing 609 has an exterior mating surface 404 around the passageway 607 through the housing 609 against which mating surface 404 a mating end 402 of the tube 605 rests or abuts. See FIGS. 4A and 4B. A spring retainer 617 spaced apart from the exterior mating surface 404 of the housing 609 restrains the movement of the spring 611 away from the exterior mating surface 404 of the housing 609. A tubular coupler 619 in proximity to the mating end 402 of the tube 605 restricts the movement of the mating end 402 of the tube 605 toward the interior area 615 of the spring 611.

The present tubular attachment system 601 is ideal for situations in which the material comprising the housing or shell 609 of the device has a different thermal expansion coefficient than that of material comprising the tube 605. For example, the tube 25 or 605 may be made of a ceramic material as mentioned above.

Figure 14:
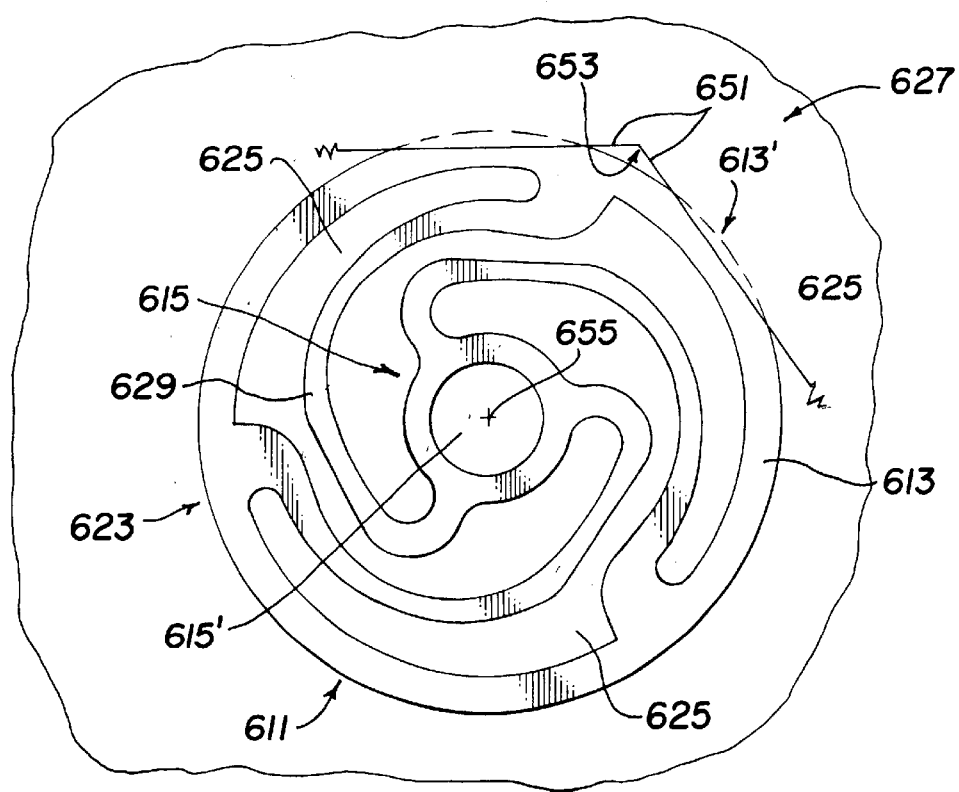
FIG. 14 is a top view of a flat type spring.
Figure 15:
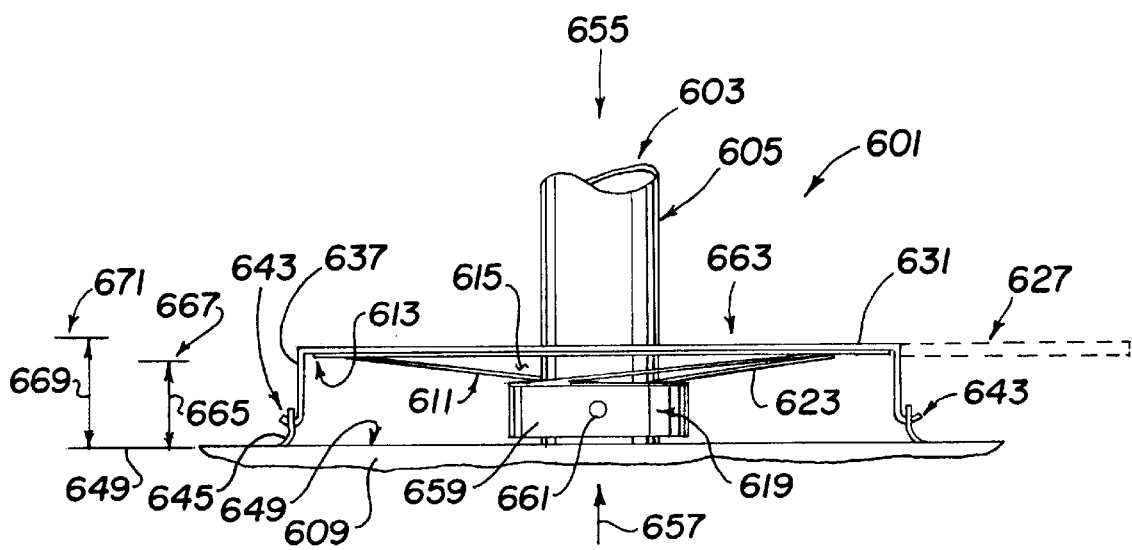
FIG. 15 is a side view of another embodiment using the flat type spring for attaching a tube to a device.

The spring 611 may be either of a known helical coil type spring 621 (FIGS. 12 and 13) or a flat or flexure spring type 623 design (FIGS. 14 and 15). The middle or interior area 613 of a flat spring 623 in the present invention flexes when pressure is applied while the movement of the exterior or outer edge 613 is restrained. The flat spring 623 may be formed by excising or etching selected areas 625 from a larger sheet 627 of suitable known material leaving spring arms 629 extending from the outer edge 613 to the inside 615 of the spring 611.

Figure 12:
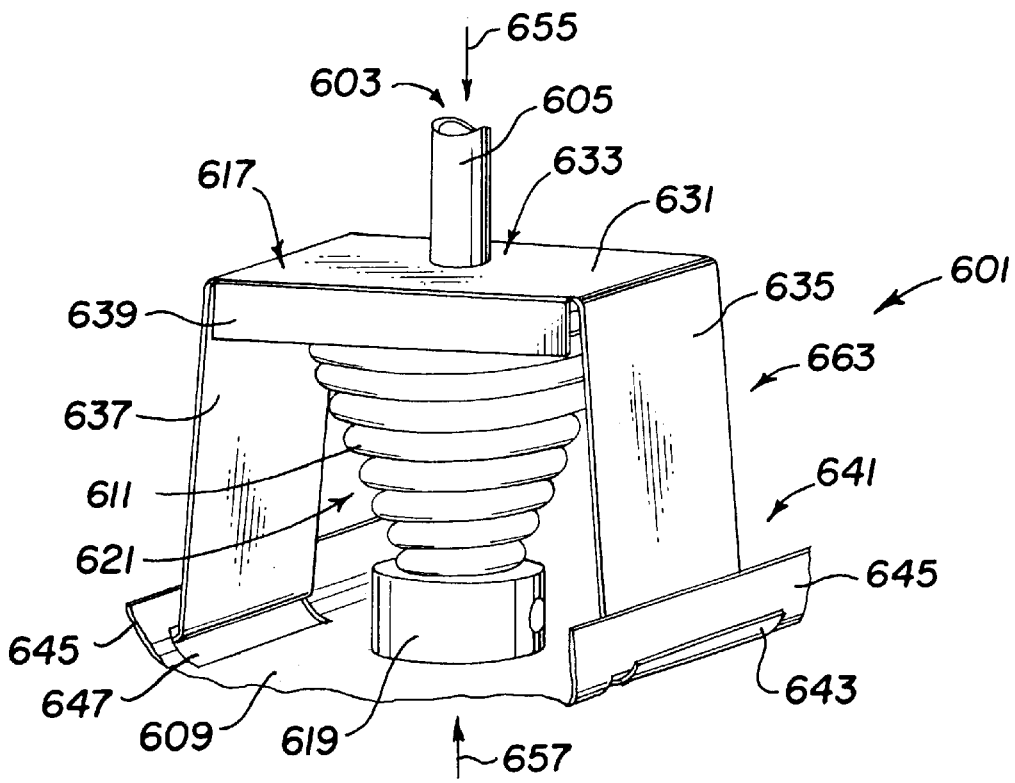
FIG. 12 is a perspective view of one embodiment using a helical coil spring for attaching a tube to a device such as the present oxygen generating system.
Figure 13:
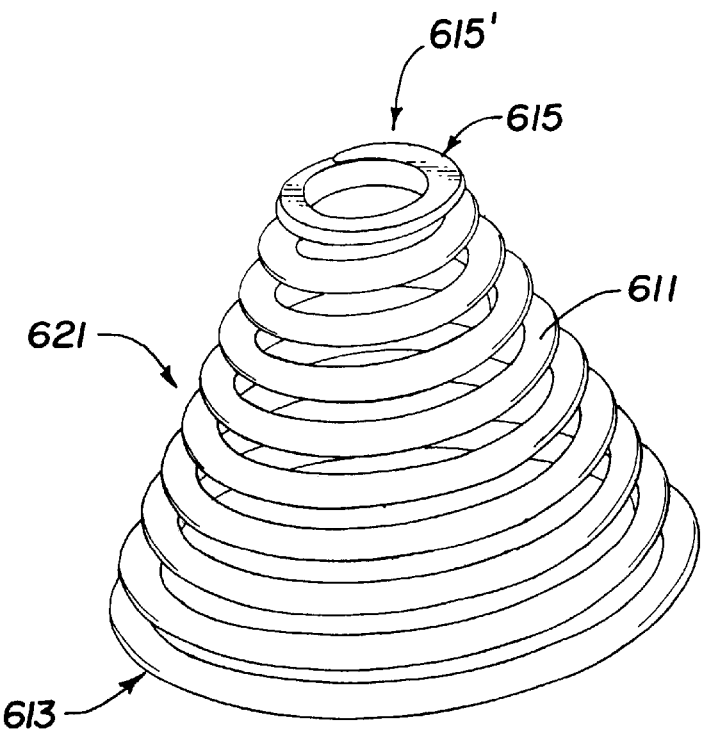
FIG. 13 is a perspective view of a known type of helical coil spring in a conically shaped taper.

The spring retainer 617 generally is attached to the housing 609 and may be removably or permanently attached as desired, such as by welding, gluing, being screwed to the housing 609 or formed as an integral part of the housing 609. As is shown in FIGS. 12 and 15, the spring retainer 617 includes an upper surface or frame 631 with an opening 633 sized to pass the tube 605 without restriction. A first support arm 635 and a second support arm 637 extend from opposing edges of the upper surface 631 and maintain the upper surface 631 spaced apart from the housing 609 and mating surface 404. An edge member 639 extends from one or both of the edges of the upper surface 631 between first and second support arms 635 and 637. The edge member 639 functions both to strengthen or increase the rigidity of the upper surface 631 as well as to maintain the position of the exterior edge 613 of the spring 611.

The first and second support arms 635 and 637 each have one end attached to the upper surface or frame 631 and a second opposing end 641 that is attached to the housing 609. As is shown in FIGS. 12 and 15, one embodiment for removably attaching the spring retainer 617 to the housing 609 is by forming ears 643 on the second ends 641 and a compatible pairs of handles 645 extending from the housing 609. The handles 645 form an opening 647 through which the ears 643 pass and engage the handles 645 to secure the spring retainer 617.

The spring retainer may optionally be part of a larger piece of sheet like material 627 that can form the upper surface 631 of the spring retainer 617 or be a section of an outer or protective shell or housing that is essentially parallel to the outer surface 649 of the housing 609.

Yet another alternative embodiment of the spring retainer 617 has a frame with an opening as the upper surface 631. See FIG. 14. Bands or edges 651 surround and engage the periphery or the outer edge 613 of the flat spring 623 creating an opening 653 through which the interior flat spring 623 can flex. A portion of the band 651 overlaps some of the outer edge 613 of the spring shown in phantom 613'.

As is discussed above, the passageway 603 in the tube 605 is in fluid communication with the fluid flowing from or in the passageway 607 through the housing 609. The alignment of the passageway 603 in the tube 605 and the passageway 607 through the housing 609 is such that the two passageways are in fluid communication and pass fluid therethrough. When the housing is an oxygen-generating device, the fluid flowing in the passageways is a gas, such as oxygen.

The present tube attachment system maintains a central axis 655 through the center of the tubular passageway 603 essentially in alignment with a central axis 657 through the center of the housing passageway 607 while being sufficiently flexible to take into account materials having differing thermal expansion coefficients or slight misalignment in the passageways 603 and 607.

Desirably the mating end 402 of the tube 605 is free from the housing 609 or is not directly affixed to the housing 609 to permit different rates of thermal expansion in the housing 609 and the tube 605. Having the junction between the tube mating end 402 and the mating surface 404 of the housing 609 separable also permits the replacement of the tube 605 in case of cracking or other degradation.

The spring 611 is attached or joined to the tube 609 at a tubular coupling 619 positioned in proximity to the mating end 402 of the tube 605. Optionally, the coupling 619 may be a collar, ring or stop block secured to the tube 605 with a setscrew 661. Alternatively, the coupling may be an ear extending from the exterior of the tube 605 or a ridge or ring extending around the tube 605 to restrain the movement of the tube-mating end 402 from passing out of the spring 611 when the tube attachment system is assembled. Yet other alternative embodiments may have the interior area 615 of the spring 611 permanently attached to the exterior of the tube 605 such as by welding or gluing, as appropriate for the selection of materials.

When the spring 611 is in a normally mounted position 663 as shown in FIGS. 12 and 15, the interior area 615 of the spring 611 is closer to the surface 649 of the housing 609 than the exterior edge 613 of the spring 611 such that the distance 665 between the housing surface 649 and the level of the interior area 667 is less than the distance 669 between the housing surface 649 and the level of the exterior edge 671 of the spring 611.

The flat spring 623 in a normally mounted position 663 maintains a desired force along the tube 605 and in the direction of the mating end 402 of the tube 605 to maintain the tube 605 abutting against the mating surface 404 of the housing 609.

Another aspect associated with assembling the ceramic modules into a useable oxygen generating system is how the modules 22 are mounted in the furnace 26 and how the electric power is applied to these modules 22. In the present invention, the means of supplying power to individual modules 22 and the means of mounting the modules 22 in the furnace are combined.

Figure 5:
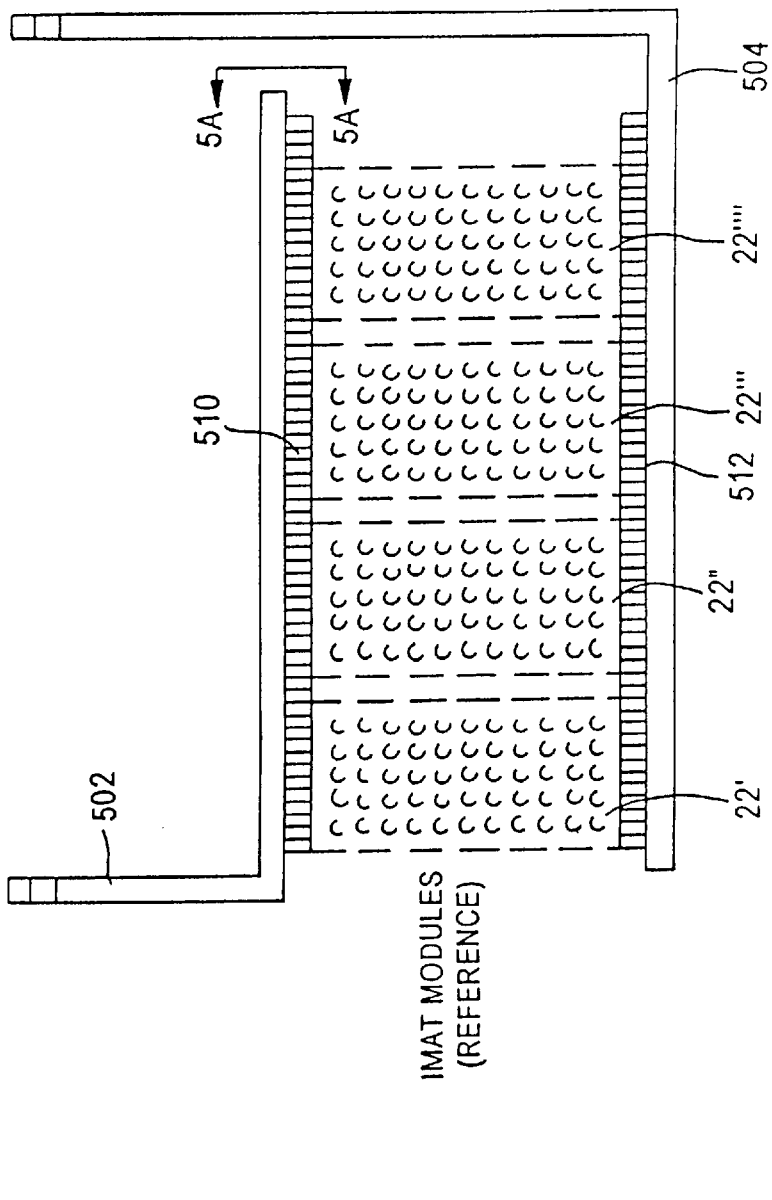
FIG. 5 depicts an arrangement for combining mounting and power provisions taken along lines 5—5 in FIG. 2.
Figure 5A:
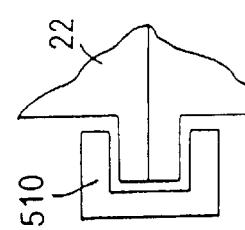
FIG. 5A is a partial cross-sectional view taken along lines 5A—5A in FIG. 5.

FIG. 5 illustrates one method of combining mounting and power provisions. As illustrated, an L-shaped support bar 502 mounted above the modules provides physical support to restrain modules 22', 22", 22''', 22"" from moving. A second L-shaped support bar 504 is mounted below the modules 22', 22", 229", 22"". Clips are formed from a material that retains strength at a high operating temperature such as Inconel or Monel. A clip is formed in a "U" shaped cross section of a suitable dimension to clamp tightly around the ends of the modules as depicted in FIG. 5A. A multi-fingered U-clip similar to typical printed circuit board card-edge electrical connectors is preferred. The multifingered U-clip can more readily accommodate module 22 thickness variations along the clip's longitudinal axis. The clips 510, 512 are permanently attached to the support bars 502, 504 using a technique such as welding or brazing. Both the clip 510, 512 and support 502, 504 are then coated with a conductive material, such as silver, to minimize electrical and interfacial resistances. Power is provided to the system by applying a positive voltage to the end of one support bar 502, 504 and a negative voltage to the end of the other support bar 502, 504. As depicted in FIG. 5, the modules 22', 22", 22''', 22'''' are provided power in a parallel-powered configuration. That is, the same voltage is applied to all modules 22', 22", 22''', 22''''.

Figure 6:
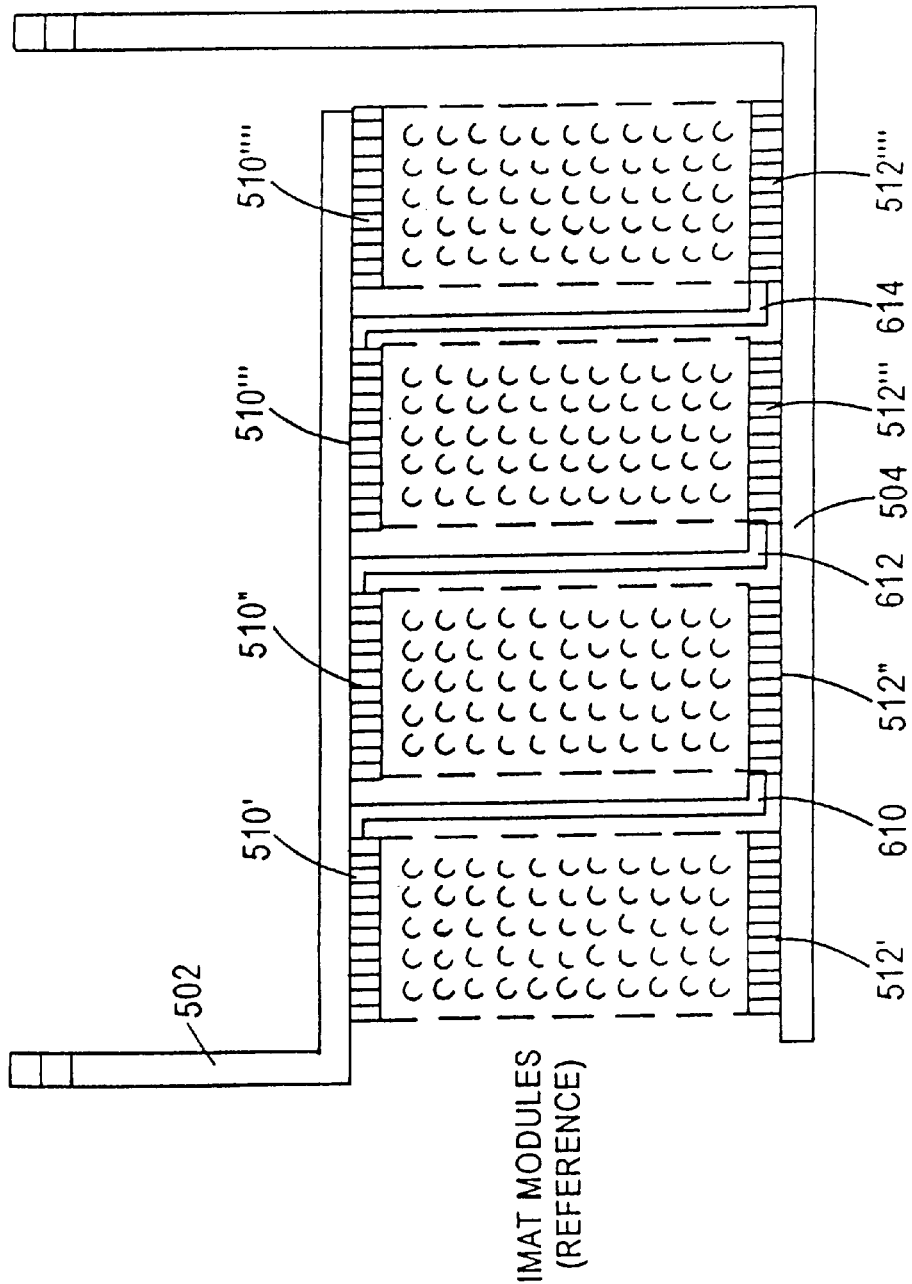
FIG. 6 depicts a mounting arrangement using "Z" clips.
Figure 7:
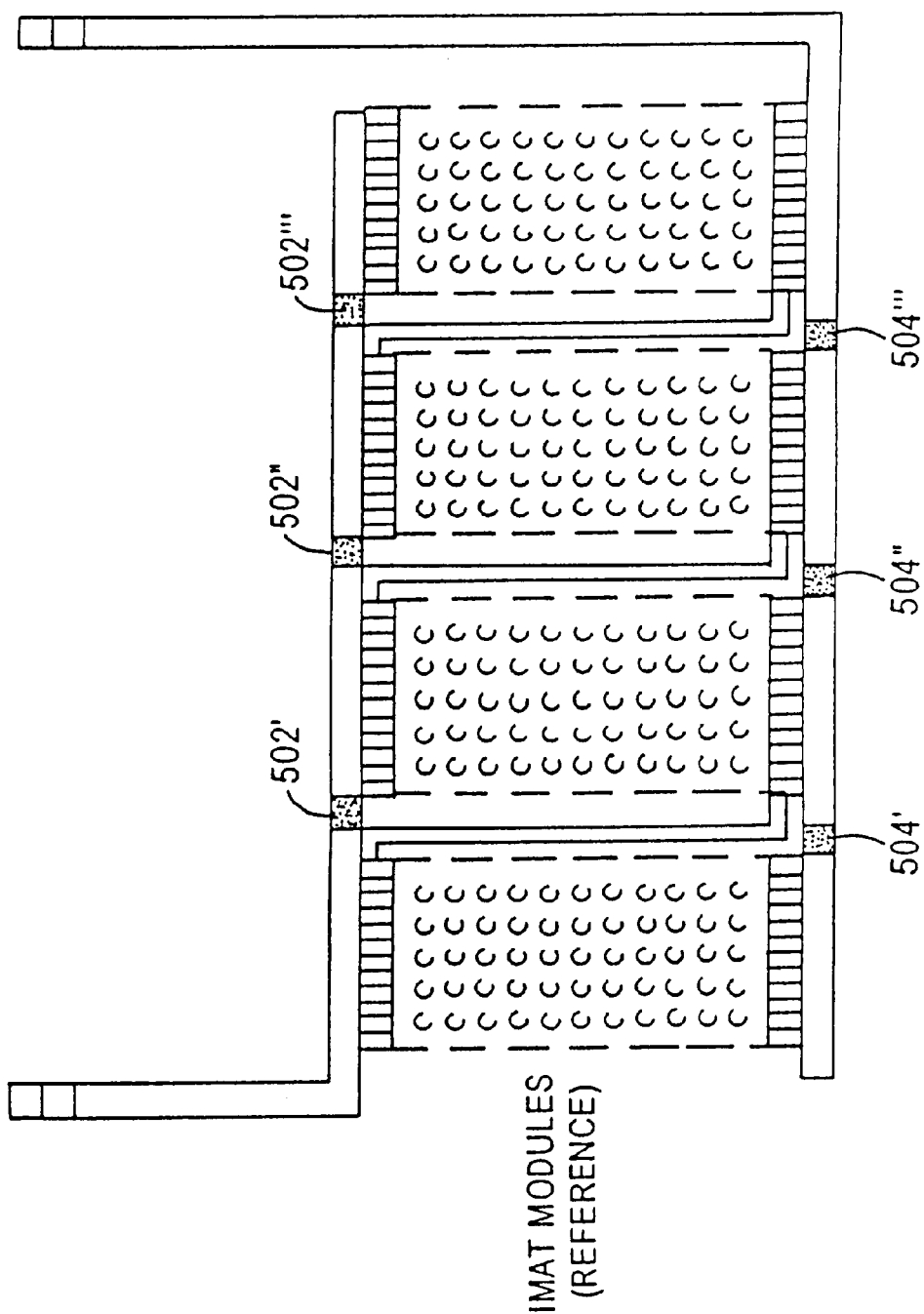
FIG. 7 depicts an alternative "Z" clip arrangement in which the support bar is segmented to provide electrical isolation.

If the surface of the support bar 502, 504 is nonconductive, as a result of a coating, oxidation layer, or bulk material property, then a series-powered configuration is also possible. If the series configuration is desired, the clips are not electrically connected to the support bars. This configuration is illustrated in FIG. 6. In this configuration, "Z" clips 610, 612, 614 are each formed from a single piece of a metal that retains strength at the operating temperature, then coated with a conductive material such as silver. Each clip 610, 612, 614 is attached to the support bar 502 can be used at each end of the string to supply the positive and negative voltages to the modules 22. In another embodiment, the clips may be electrically connected to the support bars. In this case, the support bars 502, 504 are coated with a conductive coating except in selected shaded regions 502', 502", 502''' and 504', 504", 504''' as illustrated in FIG. 7. Alternatively, the support bar can be segmented to provide electrical isolation in the designated areas shown in black. Also, by rotating every other module 180° the "z-strip" shown in FIG. 7 can be eliminated.

Figure 8:
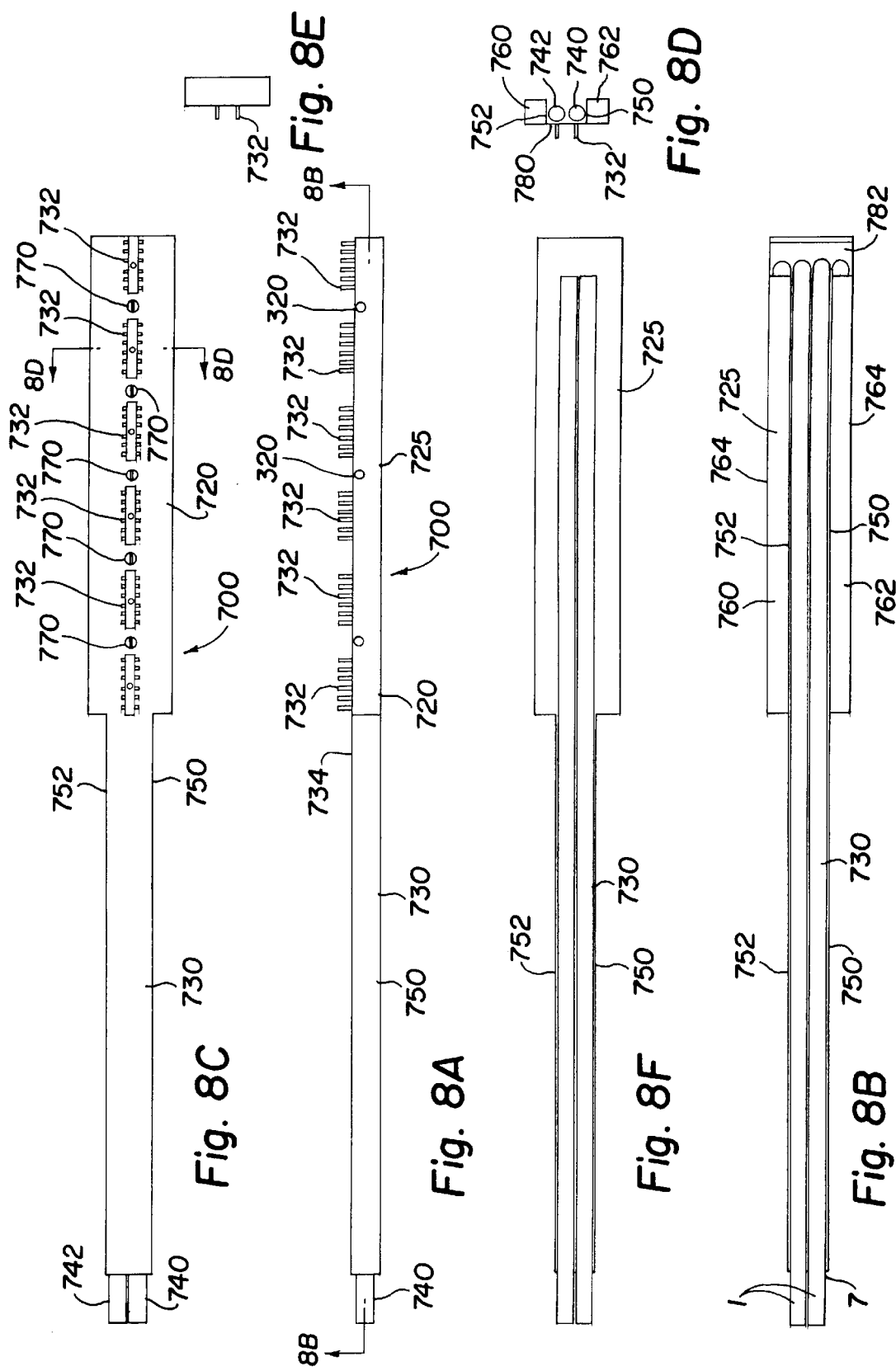
FIG. 8A is a side elevational view of an integrated air distribution manifold and mounting clip assembly.
FIG. 8B is a cross-sectional view taken through lines 8B—8B in FIG. 8A.
FIG. 8C is a top plan view of the integrated air distribution manifold.
FIG. 8D is an end view of the integrated air distribution manifold.
FIG. 8E is a cross-sectional view taken through lines 8D—8D in FIG. 8C.
FIG. 8F is a bottom plan view of the integrated air distribution manifold.
Figure 9:
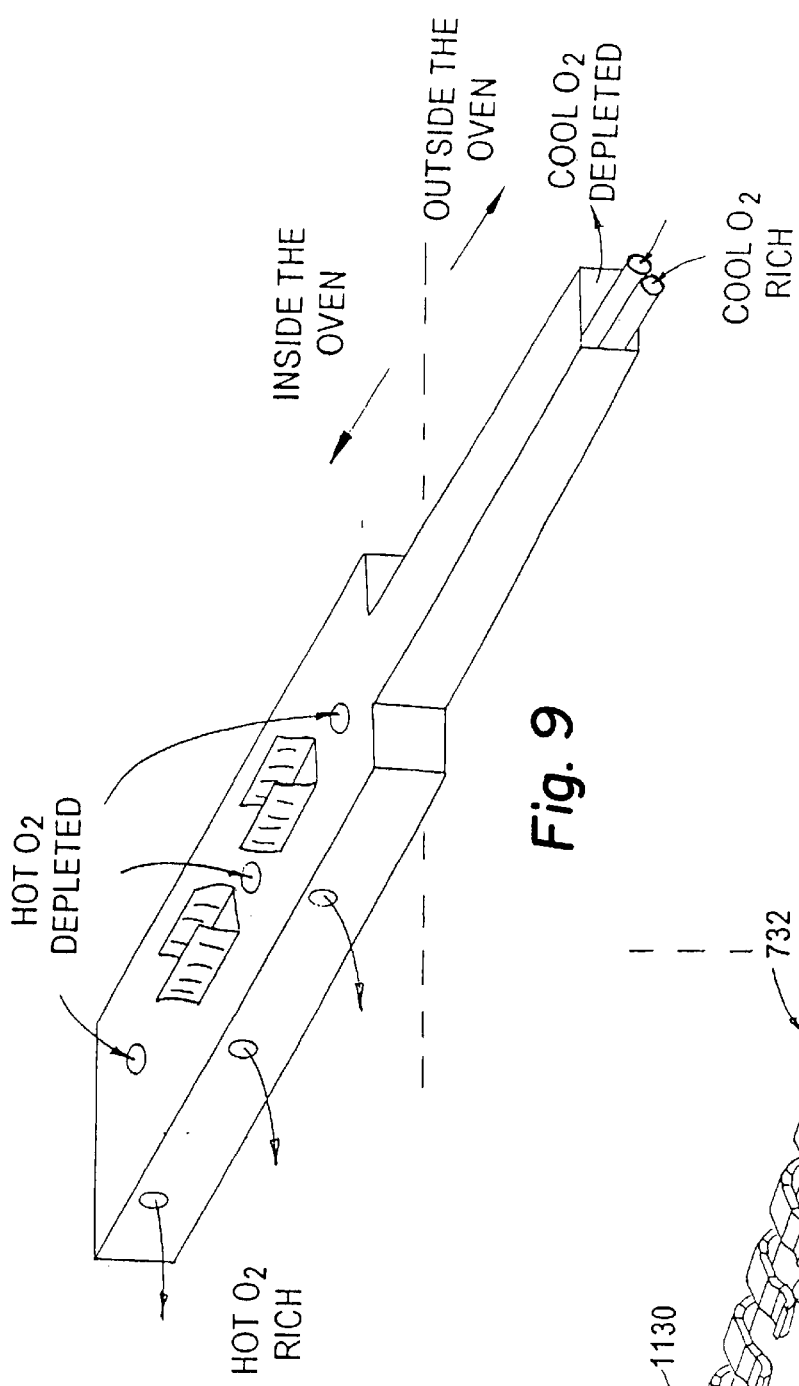
FIG. 9 is a perspective view illustrating the use of the air distribution manifold of FIGS. 8A–8F.

Referring now to FIGS. 8A–8F, an integrated air distribution manifold and mounting clip system is depicted. This manifold is primarily usable for the schematic illustrations depicted in FIGS. 2 and 3. As depicted in FIG. 8A, the manifold assembly 700 includes a manifold body 720 having a wide portion 725 which is positioned in the oven chamber 26. Extending outwardly from the oven is an outer portion 730. A plurality of manifold mounting clips 732, preferably made from Inconel are fastened to a top surface 734 of the portion 725. As depicted, there are six manifold clips 732, although it should be understood that any number can be used. Two tubes 740, 742 (see FIG. 8C) are positioned within walls 750, 752. Walls 750, 752 extend the entire length of portion 730 and for the majority of the length portion 725. A gap is formed between tube 740, 742 and walls 750, 752 to provide a passageway. As depicted in FIG. 8, there are outer passageways 760, 762 formed between walls 750, 764 and 752, 764. As depicted in FIG. 8C, there are a plurality of holes worn between mounting clips 732 in the portion 730. The holes are 770. As depicted in FIG. 8D, the mounting clip 732 extends inwardly into the oven chamber 726.

It should be noted that two manifold assemblies are used on opposite ends of the ceramic modules 22. The manifolds 700 can either be mounted horizontally or vertically. Ceramic oxygen generating modules 22 are each clipped into a pair of clips 732 as described below.

As depicted in FIG. 8E, a return passageway 780 is formed between walls 750, 752, tubes 740, 742 and the upper surface 734 of manifold body 720.

The wider portion 730 of the assembly 700 where the mounting clip 732 is attached is inside the oven chamber 26 while the narrower portion 730 of the assembly 700 is outside the oven chamber 26. The manifold assembly operates as follows: cool fresh air flows through tubular elements 740, 742, picking up heat as the cool fresh air flows to the opposite end 782 (see FIG. 8B). At the end of 782, the fresh air makes a turn and flows into the outer distribution passages 760, 762. The hot fresh air then enters the oven chamber 26 through holes 320. Hot oxygen depleted air exits the oven chamber 26 through holes 770 into the volume 780 formed between the tubular elements 740, 742 and the distribution passages 760, 762. The hot depleted air passes over the tubular element 740, 742 giving up heat to the fresh air inside the tubular elements 740, 742 as the hot depleted air flows out of portion 730. Advantageously the manifold assembly has the following functions and features: mechanical supporter of the ceramic modules 22, electrical connection to the ceramic modules 22, fresh air distribution and injection into the oven chamber 26, depleted air extraction from the oven chamber 26, heat exchange between the fresh and depleted air, and cooling of the mounting clip 732 and manifold assembly 700 due to heat exchange within.

Figure 10:
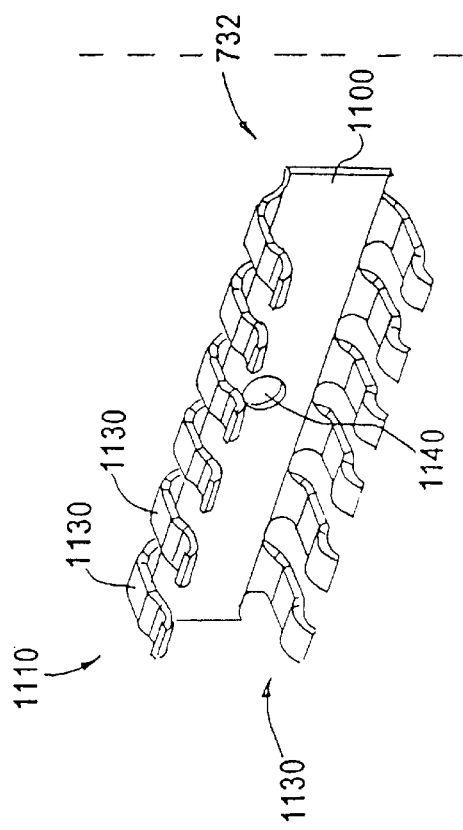
FIG. 10 is a perspective view of the mounting clip used in the present invention.

The mounting clip 732 is depicted in FIG. 10 is a sheet metal part that has a flat mounting face 1100 and two rows of contacts 1110, 1120. Each of the contacts 1130 provides for secure mounting and electrical connection for each of the ceramic modules 22. Inconel or another high temperature alloyed is preferred as the material for the mounting clip.

The assembly 700 will be somewhat cooler than the ceramic modules 22 and oven chamber 26 is a consequence of the heat exchange occurring within. The cooler temperature will provide for longer assembly life and/or less stringent metallic material requirements. The cooler temperature will also help ensure electrical connection integrity because of more stiffness in the mounting clip 732 material, less degradation of the conductive coating that is applied to the clips 732, and higher electrical conductivity of the metallic materials.

The oxygen generating system described herein can also be used to provide a supply of pure oxygen from an air supply that contains chemical or biological contaminants. Because of the nature of the process used to generate oxygen and the temperature at which the system operates, chemical and/or biological contaminant are precluded from passing through the oxygen-generating modules 22 into the product plenum 34. In addition, because of the high operating temperature of the modules 22, the operating temperature is sufficient to kill most or all biological agents and decompose toxic compounds. The foregoing arrangement has many uses including, but not necessarily limited to, providing pure oxygen to processes which operate in a contaminated environment, for example, in chemical plants and pharmaceutical manufacturing operations, and may also be used to provide oxygen for human consumption in environments that have been intentionally contaminated as a result of chemical and/or biological warfare. Furthermore, it is possible to utilize one or more oxygen generators such as those described herein for the purpose of decontaminating air in a building or other environment that has been subject to intentional or unintentional chemical and/or biological contamination, for example, for an accidental biological release in a laboratory environment.

The properties of the solid ceramic electrolyte enable the separation process to occur at a fundamentally higher level of selectivity than is possible using porous filtration methods, such as pressure-swing adsorption (PSA). The solid electrolyte used in forming the ceramic modules 22 is formed as a dense ceramic member (defined as containing no open porosity). The crystal structure of the solid electrolyte contains oxygen ions, in addition to metal cat-ions. Examples of chemical formulas are $ZrO_2$ and $CeO_2$. The base compositions are altered by the substitution of a small percentage (typically 5%–20%) of the metal ions by another metal cat-ion of a slightly different size and electrical charge. The result of the substitution is the creation of oxygen vacancies within the crystal structure of the ceramic material. At elevated temperatures (above 500 degrees C. for known ceramic electrolytes) the negatively charged oxygen ions present in the ceramic material are able to move in response to an applied electric field. The oxygen ions move toward the positively charged surface by diffusing into crystal lattice sites that contain oxygen vacancies. When the oxygen ions reach the positively charged surface, they recombine to form oxygen gas ($O_2$).

The oxygen ions and the vacancies through which they diffuse in the Electrochemical Oxygen Generating System have a radius on the order of 1 Angstrom ($10^{-10}$ meters). This small size precludes the entry of any biological agent or other toxic compound. Additionally, the crystal structure is adapted specifically to incorporate the size and electronic orbital structure of the oxygen ion. Occupancy of these sites by any ion other than oxygen would require a rearrangement of the crystal structure, which would require an amount of energy much greater than that encountered during the operation of this device. The ceramic electrolyte can be operated between 500 and 1000 degrees Celsius, which is sufficiently high to decompose most or all biological agents and toxic compounds.

Figure 11:
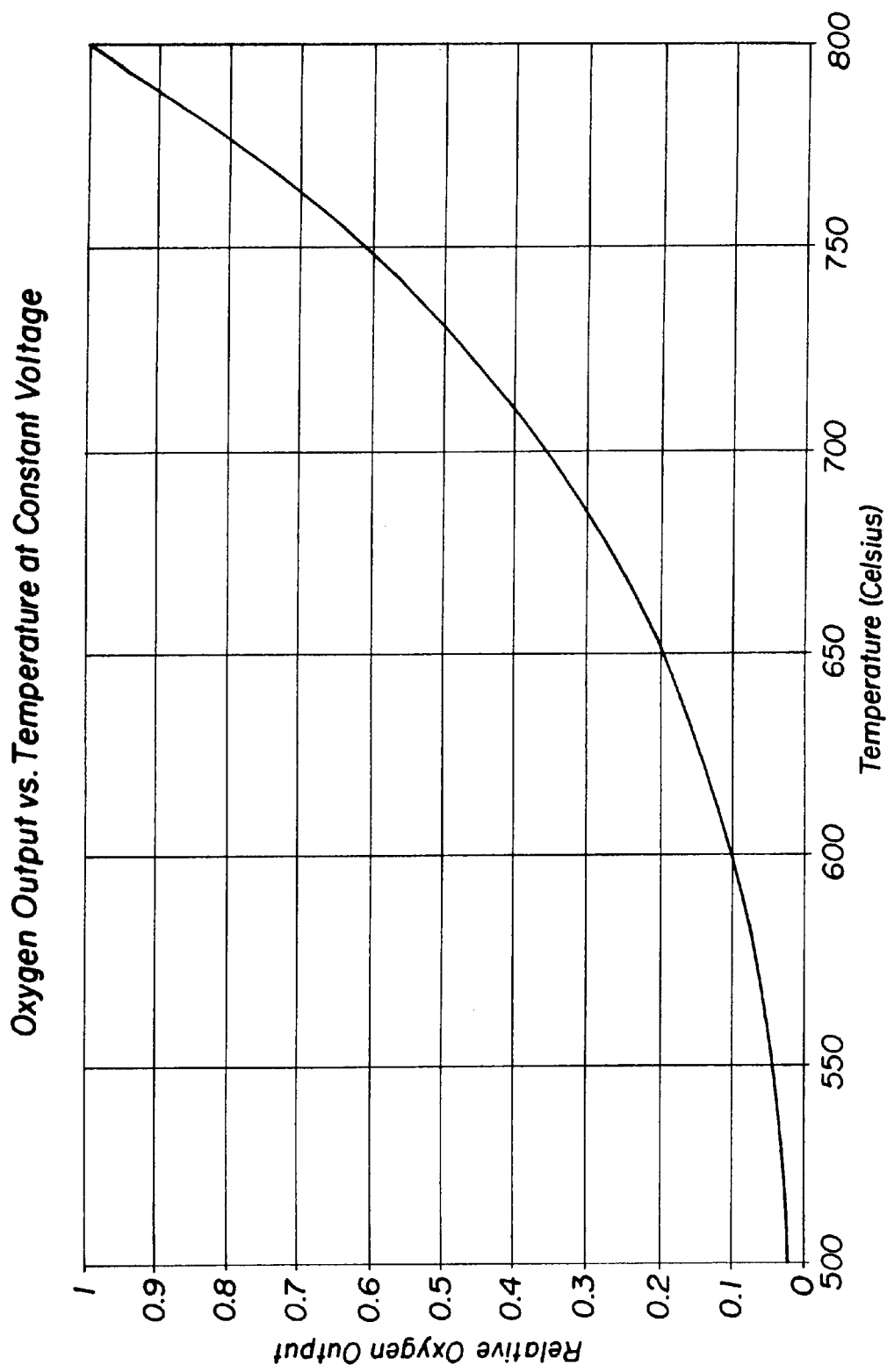
FIG. 11 is a graph illustrating the temperature dependence of oxygen output for the electrochemical oxygen generating system according to the present invention.

The temperature dependence of oxygen output for Electrochemical Oxygen Generating System is illustrated in FIG. 11. The oxygen output of the oxygen generating system is directly proportional to the electrical current measured across the ceramic modules. When a constant electrical voltage is applied across a module, the amount of current, I, generated is related to the voltage, V, and the electrical resistance, R, of the ceramic electrolyte by the following relationship known as Ohm's Law.

$$I=V/R$$

The electrical resistance of the electrolyte decreases strongly with increasing temperature, resulting in a higher oxygen output when the voltage is held constant and the temperature is increased. The temperature dependence between 500 and 800 degrees Celsius is shown in FIG. 11.

A passageway 603 of a tube 605 may be maintained in axial alignment with a passageway 607 through a housing 609 by attaching a spring 611 to a selected tube 605 with a tubular coupling 619 for restricting the movement of the mating end 402 of the tube 605 toward an interior area 615 of the spring 611. The tubular coupling 619 is formed in proximity to the tube mating end 402. The spring 611 has an exterior edge 613 and the interior area 615 through which the tube 605 passes. An exterior mating surface 404 is formed in the housing 609 around the passageway 607 through the housing 609 against which mating surface 404 a mating end 402 of the tube 605 abuts. The spring 611 is mounted with a spring retainer 617 spaced apart from the exterior mating surface 404 of the housing 609 for restraining movement of the spring 611 away from the exterior mating surface 404 of the housing 609.

The foregoing disclosure and description of the invention are illustrative and explanatory thereof, and various changes in the size, shape and materials, as well as in the details of the illustrated construction may be made without departing from the spirit of the invention.

Claim(s):

1. An attachment system for maintaining a passageway of a tube in axial alignment with a passageway through a housing, comprising:

a flat spring having an exterior edge and having an interior area through which the tube passes;

the housing having an exterior mating surface around the passageway through the housing against which mating surface a mating end of the tube abuts;

a spring retainer means spaced apart from the exterior mating surface of the housing for restraining movement of the flat spring away from the exterior mating surface of the housing; and tubular coupling means in proximity to the mating end of the tube for restricting the movement of the mating end of the tube toward the interior area of the flat spring.

2. The invention of claim 1 wherein the exterior mating surface of the housing forms an indentation surrounding the passageway through the housing; and the indentation is formed to be compatible with the mating end of the tube.

3. The invention of claim 1 wherein material comprising the housing has a different thermal expansion coefficient than that of material comprising the tube.

4. The invention of claim 1 wherein the tube is made of a ceramic material.

5. The invention of claim 1 wherein the spring retainer is attached to the housing.

6. The invention of claim 1 wherein the spring retainer is removably attached to the housing.

7. The invention of claim 1 wherein the housing is an electro-chemical oxygen generating system.

8. The invention of claim 1 wherein the passageway in the tube communicates fluid out of the passageway of the housing.

9. The invention of claim 1 wherein the alignment of the passageway in the tube and the passageway through the housing is such that the two passageways are in fluid communication and pass fluid therethrough.

10. The invention of claim 9 wherein the fluid is a gas.

11. The invention of claim 1 wherein the mating end of the tube is free from the housing.

12. The invention of claim 1 wherein the spring is attached to the tube at the tubular coupling.

13. The invention of claim 1 wherein in a normally mounted position the interior area of the spring is closer to the housing than the exterior edge of the spring.

14. The invention of claim 1 wherein the flat spring in a normally mounted position maintains a desired force in the mating end of the tube abutting against the mating surface of the housing.

15. The invention of claim 1 wherein the flat spring comprises a sheet like material and the flat spring is formed by excising selected areas from the sheet.

16. The invention of claim 1 wherein the mating end of the tube is separable from the housing.

17. An attachment system for maintaining a passageway of a tube in axial alignment with a passageway through a housing, comprising:

a spring having an exterior edge and having an interior area through which the tube passes;

the housing having an exterior mating surface around the passageway through the housing against which mating surface a mating end of the tube abuts;

a spring retainer means spaced apart from the exterior mating surface of the housing for restraining movement of the spring away from the exterior mating surface of the housing; and tubular coupling means in proximity to the mating end of the tube for restricting the movement of the mating end of the tube toward the interior area of the spring.

18. The invention of claim 17 wherein the spring is a helical coil type spring.

19. A method for maintaining a passageway of a tube in axial alignment with a passageway through a housing, comprising the steps of:

attaching a spring to the tube with a tubular coupling means for restricting the movement of a mating end of the tube toward an interior area of the spring; the tubular coupling formed in proximity to the mating end of the tube; the spring having an exterior edge and having the interior area through which the tube passes;

forming an exterior mating surface in the housing around the passageway through the housing against which mating surface the mating end of the tube abuts; and mounting the spring with a spring retainer means spaced apart from the exterior mating surface of the housing for restraining movement of the spring away from the exterior mating surface of the housing.

20. The method of claim 19 wherein the spring is a helical coil type spring.

21. The method of claim 19 wherein the spring is a flat type spring.

22. The method of claim 19 wherein the exterior mating surface of the housing forms an indentation surrounding the passageway through the housing; and the indentation is formed to be compatible with the mating end of the tube.

23. The method of claim 19 wherein material comprising the housing has a different thermal expansion coefficient than that of material comprising the tube.

24. The method of claim 19 wherein the tube is made of a ceramic material.

25. The method of claim 19 wherein the spring retainer is attached to the housing.

26. The method of claim 19 wherein the spring retainer is removably attached to the housing.

27. The method of claim 19 wherein the housing is an electro-chemical oxygen generating system.

28. The method of claim 19 wherein the passageway in the tube communicates fluid out of the passageway of the housing.

29. The method of claim 19 wherein the alignment of the passageway in the tube and the passageway through the housing is such that the two passageways are in fluid communication and permit fluid to pass therethrough.

30. The method of claim 29 wherein the fluid is a gas.

31. The method of claim 19 wherein the mating end of the tube is free from the housing.

32. The method of claim 19 wherein the spring is attached to the tube at the tubular coupling.

33. The method of claim 19 wherein in a normally mounted position the interior area of the spring is closer to the housing than the exterior edge of the spring.

34. The method of claim 19 wherein the spring in a normally mounted position maintains a desired force in the mating end of the tube abutting against the mating surface of the housing.

35. The method of claim 21 wherein the flat spring comprises a sheet like material and the flat spring is formed by excising selected areas from the sheet.

36. The method of claim 19 wherein the mating end of the tube is separable from the housing.

* * * * *